(12) United States Patent
Biset et al.

(10) Patent No.: US 10,309,305 B2
(45) Date of Patent: Jun. 4, 2019

(54) ACOUSTIC PANEL WITH SIDEWALL STRINGERS

(71) Applicant: Rohr, Inc., Chula Vista, CA (US)

(72) Inventors: Charles Michael Biset, San Diego, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 76 days.

(21) Appl. No.: 15/355,975

(22) Filed: Nov. 18, 2016

(65) Prior Publication Data

US 2018/0142621 A1 May 24, 2018

(51) Int. Cl.
| | |
|---|---|
| *F02C 7/045* | (2006.01) |
| *F02C 7/24* | (2006.01) |
| *G10K 11/168* | (2006.01) |
| *G10K 11/16* | (2006.01) |
| *F02K 1/82* | (2006.01) |
| *G10K 11/172* | (2006.01) |
| *F02C 7/00* | (2006.01) |

(52) U.S. Cl.
CPC .............. *F02C 7/045* (2013.01); *F02K 1/827* (2013.01); *G10K 11/16* (2013.01); *G10K 11/168* (2013.01); *G10K 11/172* (2013.01)

(58) Field of Classification Search
CPC . F02C 7/045; F02C 7/24; F02K 1/827; G10K 11/168; G10K 11/172; B32B 3/12
See application file for complete search history.

(56) References Cited

U.S. PATENT DOCUMENTS

| | | | | |
|---|---|---|---|---|
| 2,333,343 | A | * 11/1943 | Sendzimir | B21D 53/00 156/197 |
| 3,341,395 | A | * 9/1967 | Weber | E04C 2/3405 428/134 |
| 3,380,206 | A | * 4/1968 | Barnett | E04B 9/001 181/292 |

(Continued)

FOREIGN PATENT DOCUMENTS

| | | | | |
|---|---|---|---|---|
| FR | 2396868 A1 | * 2/1979 | | F02K 1/827 |
| GB | 1406844 A | * 9/1975 | | F02C 7/24 |
| RU | 2064691 C1 | 7/1996 | | |

OTHER PUBLICATIONS

EP search report for EP17202635.3 dated Apr. 3, 2018.

*Primary Examiner* — Edgardo San Martin
(74) *Attorney, Agent, or Firm* — O'Shea Getz P.C.

(57) ABSTRACT

A panel is provided for attenuating noise. This panel includes a porous first skin, a second skin and a core, which is connected between the porous first skin and the second skin. The core includes a corrugated body and a plurality of stringer bodies. The corrugated body includes a plurality of corrugations configured from at least a plurality of baffles and a plurality of porous septums. Each of the corrugations includes a respective one of the baffles and a respective one of the porous septums. A first of the corrugations forms a first channel that extends laterally between a first of the baffles and a first of the porous septums. The stringer bodies are spaced longitudinally along the first channel. Each of the stringer bodies includes a first sidewall disposed within the first channel and configured to fluidly isolate longitudinally adjacent portions of the first channel from one another.

17 Claims, 14 Drawing Sheets

(56) References Cited

U.S. PATENT DOCUMENTS

| | | | | |
|---|---|---|---|---|
| 3,734,234 A * | 5/1973 | Wirt | ............................ | E04B 1/86 181/286 |
| 3,831,710 A * | 8/1974 | Wirt | ...................... | G10K 11/172 181/286 |
| 3,848,697 A * | 11/1974 | Jannot | ...................... | F02K 1/827 181/220 |
| 3,913,702 A * | 10/1975 | Wirt | ........................ | B64D 33/06 181/286 |
| 3,963,094 A | 6/1976 | Nowikas | | |
| 4,231,447 A | 11/1980 | Chapman | | |
| 4,298,090 A * | 11/1981 | Chapman | ................... | F02C 7/24 181/286 |
| 4,333,598 A | 6/1982 | Ittner et al. | | |
| 4,643,933 A * | 2/1987 | Picken | ...................... | B32B 3/12 428/116 |
| 5,487,930 A * | 1/1996 | Lockshaw | ................. | B32B 3/12 428/53 |
| 5,635,306 A * | 6/1997 | Minamida | .............. | B21D 47/00 228/181 |
| 6,274,216 B1 | 8/2001 | Gonidec et al. | | |
| 6,536,556 B2 * | 3/2003 | Porte | .......................... | B32B 3/12 181/284 |
| 6,544,623 B1 | 4/2003 | Straza | | |
| 6,725,541 B1 * | 4/2004 | Holme | ....................... | F02K 1/54 29/889.2 |
| 7,051,489 B1 * | 5/2006 | Swiszcz | ................. | E04B 9/0442 160/84.05 |
| 7,661,510 B2 * | 2/2010 | Muller | ................. | G10K 11/168 181/213 |
| 7,784,283 B2 * | 8/2010 | Yu | .............................. | F02K 1/04 181/213 |
| 7,824,775 B2 * | 11/2010 | Copley | ............... | B23K 15/0006 219/121.14 |
| 8,628,635 B2 * | 1/2014 | Chelin | .................... | B29C 70/30 156/219 |
| 9,127,452 B1 | 9/2015 | Winfield et al. | | |
| 9,303,588 B2 | 4/2016 | Pongratz et al. | | |
| 9,592,918 B2 * | 3/2017 | Yu | ........................... | B64D 33/06 |
| 9,704,467 B1 * | 7/2017 | Nampy | ................. | G10K 11/172 |
| 9,761,216 B2 * | 9/2017 | Nampy | ................. | G10K 11/172 |
| 2006/0112655 A1 * | 6/2006 | Swiszcz | ................. | E04B 9/0442 52/222 |
| 2011/0244150 A1 | 10/2011 | Thrash et al. | | |
| 2017/0301334 A1 * | 10/2017 | Nampy | ...................... | F02C 7/24 |

* cited by examiner

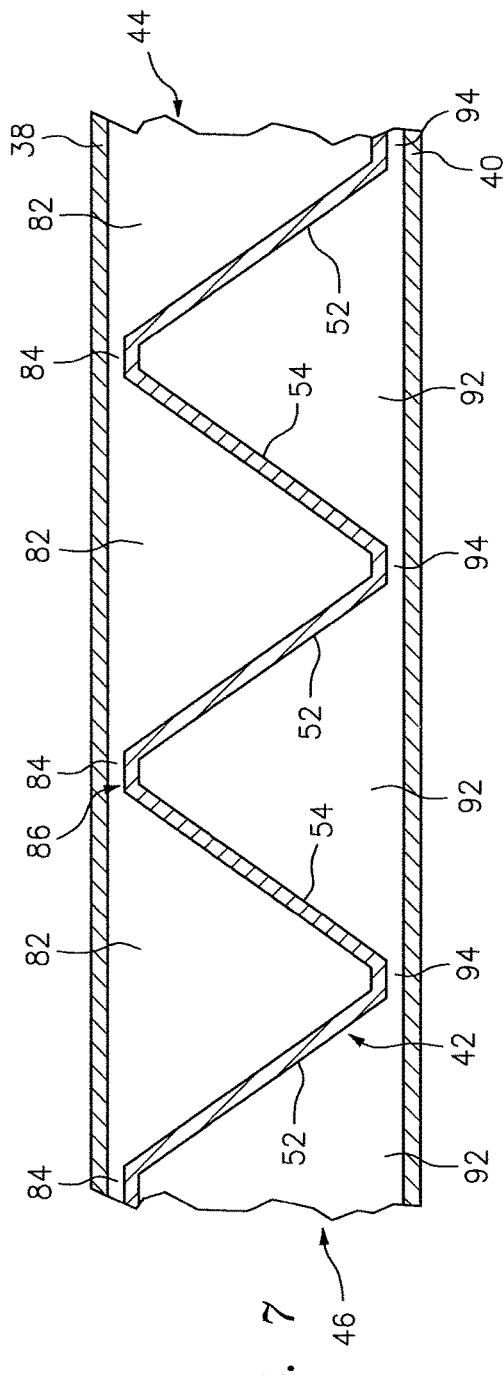
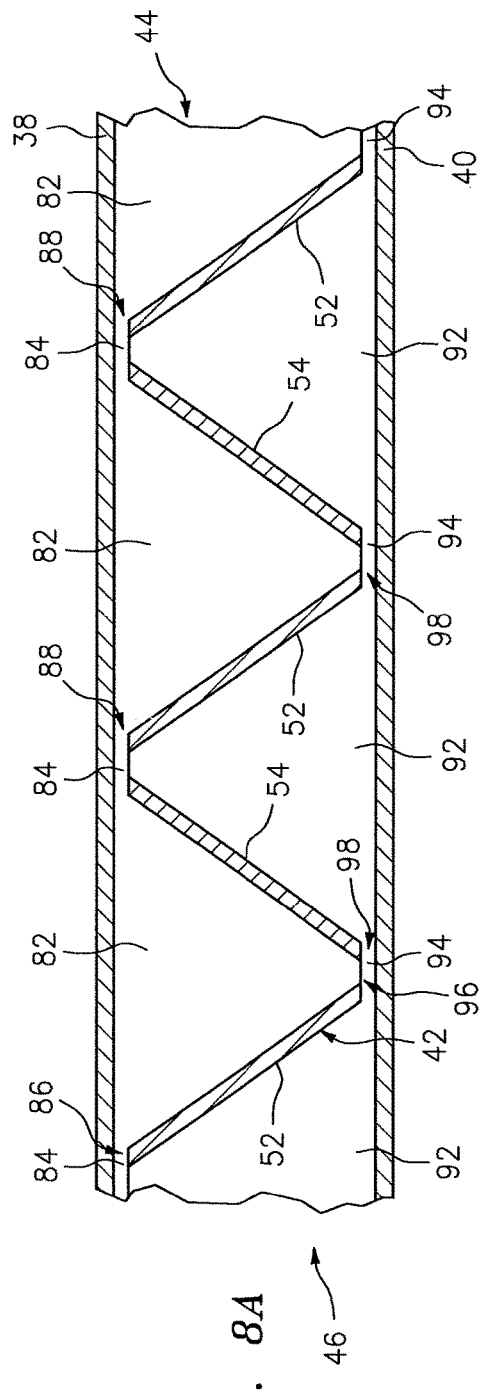
FIG. 7
FIG. 8A

ACOUSTIC PANEL WITH SIDEWALL STRINGERS

BACKGROUND OF THE INVENTION

1. Technical Field

This disclosure relates generally to noise attenuation and, more particularly, to an acoustic panel (sometimes also referred to as "an acoustic liner" for attenuating noise generated by, for example, a gas turbine engine for an aircraft propulsion system.

2. Background Information

Acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers to attenuate higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints (e.g., loft envelope) for those engines, however, typically limit or prohibit increasing the thickness of an acoustic panel to tune its resonating chambers for such relatively low frequency noise. There is a need in the art therefore for an acoustic panel operable to attenuate relatively low frequency noise while utilizing the same or less space than previous acoustic panels. There is a further need to provide a panel configuration capable of reducing panel assembly time, complexity and cost.

SUMMARY OF THE DISCLOSURE

According to an aspect of the present disclosure, a panel is provided for attenuating noise. This panel includes a porous first skin, a second skin and a core connected between the porous first skin and the second skin. The core includes a corrugated body and a plurality of stringer bodies. The corrugated body includes a plurality of corrugations configured from at least a plurality of baffles and a plurality of porous septums. Each of the corrugations includes a respective one of the baffles and a respective one of the porous septums. A first of the corrugations forms a first channel that extends laterally between a first of the baffles and a first of the porous septums. The stringer bodies are spaced longitudinally along the first channel. Each of the stringer bodies is configured as or otherwise includes a first sidewall disposed within the first channel and configured to fluidly isolate longitudinally adjacent portions of the first channel from one another.

According to another aspect of the present disclosure, another panel is provided for attenuating noise. This panel includes a first skin configured with a plurality of perforations. The panel also includes a second skin and a core connected between the first skin and the second skin. The core includes a corrugated body and a stringer body. The corrugated body includes a plurality of channels and a plurality of corrugations configured from at least a plurality of baffles and a plurality of porous septums. Each of the corrugations includes a respective one of the baffles and a respective one of the porous septums. Each of the corrugations forms a respective one of the channels. The stringer body extends laterally across the channels. The stringer body includes a plurality of sidewalls. Each of the sidewalls is configured to fluidly isolate longitudinally adjacent portions of a respective one of the channels from one another.

The corrugated body may include a plurality of second channels. The core may include a second stringer body that includes a plurality of second sidewalls. Each of the second sidewalls may be configured to fluidly isolate longitudinally adjacent portions of a respective one of the second channels from one another. The corrugated body may be between the stringer body and the second stringer body.

A second of the corrugations may form a second channel that extends laterally between a second of the baffles and a second of the porous septums. Each of the stringer bodies may be configured as or otherwise include a second sidewall disposed within the second channel and configured to fluidly isolate longitudinally adjacent portions of the second channel from one another.

Each of the stringer bodies may extend laterally across the first of the corrugations and a second of the corrugations.

The first sidewall of each of the stringer bodies may extend from the porous first skin to the first of the baffles and the first of the porous septums.

The first sidewall of each of the stringer bodies may extend from the second skin to the first of the baffles and the first of the porous septums.

A second channel may extend laterally between the first of the porous septums and a second of the baffles. The core may include a plurality of second stringer bodies. Each of the second stringer bodies may be configured as or otherwise include a second sidewall disposed within the second channel and configured to fluidly isolate longitudinally adjacent portions of the second channel from one another.

The first channel and the second channel may be on opposing sides of the corrugated body.

A cavity may extend laterally between the first of the baffles and the second of the baffles and be fluidly coupled with perforations in the porous first skin. The first septum may extend from the porous first skin and the first of the baffles to the second skin and the second of the baffles, and/or may divide the cavity into fluidly coupled first and second sub-cavities. The first sub-cavity may extend longitudinally between the first sidewalls of an adjacent pair of the stringer bodies. The second sub-cavity may extend longitudinally between the second sidewalls of an adjacent pair of the second stringer bodies.

Each of the stringer bodies may include a tongue laterally connected to the first sidewall. The tongue may be mated with a respective groove in a peak formed by the first of the baffles and a second of the porous septums.

A second of the corrugations may form a second channel that extends laterally between a second of the baffles and the second of the porous septums. Each of the stringer bodies may be configured as or otherwise include a second sidewall disposed within the second channel and configured to fluidly isolate longitudinally adjacent portions of the second channel from one another. The tongue may be configured as a bridge that extends laterally between and connects the first sidewall and the second sidewall.

A second of the corrugations may form a second channel that extends laterally between a second of the baffles and a second of the porous septums. Each of the stringer bodies may be configured as or otherwise include a second sidewall and a bridge. The side sidewall may be disposed within the second channel and configured to fluidly isolate longitudinally adjacent portions of the second channel from one another. The bridge may extend laterally between and connect the first sidewall and the second sidewall.

The bridge may lay over a peak formed by the first of the baffles and the second of the porous septums.

The first sidewall may be configured as a single wall structure.

The first sidewall may be configured as a multi-wall structure.

Each of the stringer bodies may include a tab that projects out from the first sidewall and is attached to the corrugated body.

Each of the stringer bodies may be formed from sheet metal.

The corrugated structure may be configured from or otherwise include composite material. Each of the stringer bodies may be configured from or otherwise include metal.

Each of the stringer bodies may be configured from or otherwise include polymer.

The foregoing features and the operation of the invention will become more apparent in light of the following description and the accompanying drawings.

BRIEF DESCRIPTION OF THE DRAWINGS

FIG. 7 is sectional schematic illustration of a portion of an alternative acoustic panel.

FIGS. 8A-8D are illustrations of portions of another alternative acoustic panel.

DETAILED DESCRIPTION OF THE INVENTION

Figure 1:
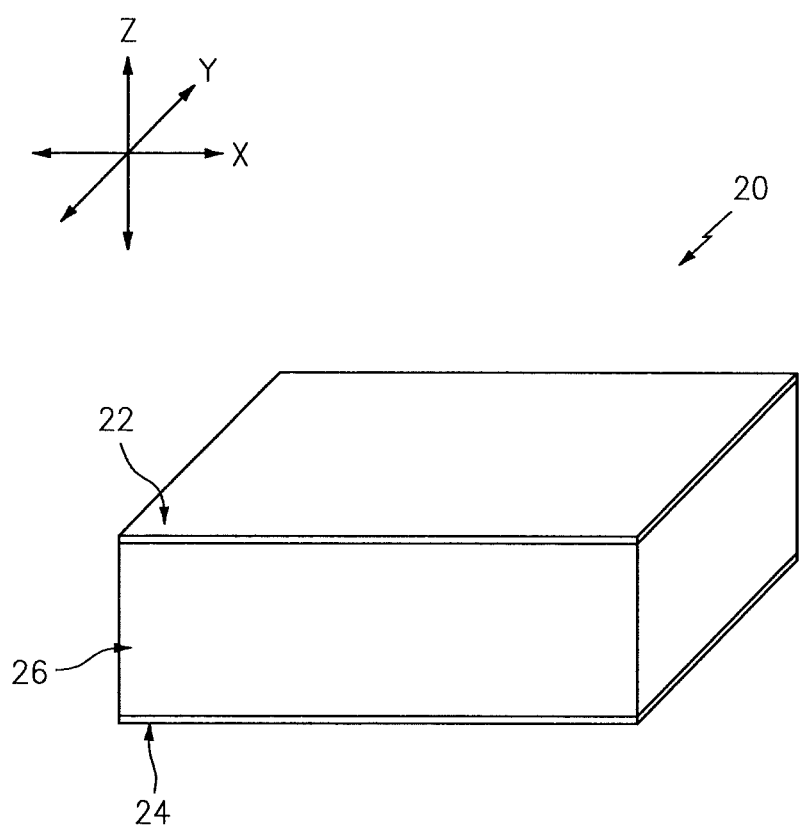
FIG. 1 is a partial, perspective block diagram illustration of a structural, acoustic panel for attenuating noise.

FIG. 1 is a partial, perspective block diagram illustration of a structural, acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or with an inner or outer barrel, a translating sleeve of a thrust reverser, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. The acoustic panel 20 of the present disclosure, however, may alternatively be configured for non-aircraft applications.

The acoustic panel 20 extends longitudinally along a y-axis. The acoustic panel 20 extends laterally along an x-axis. The acoustic panel 20 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical or conical with or without radial undulations. Thus, the vertical direction may change at different locations along the x-y plane; e.g., the vertical direction may be a radial direction for a cylindrical, conical or spherical acoustic panel.

The acoustic panel 20 includes an acoustic porous top skin 22 (e.g., a perforated face skin), a solid, non-perforated bottom skin 24 (e.g., a back skin) and a cellular core 26. Note, the terms "top" and "bottom" are used in this disclosure to describe the relative position of an element as viewed in the figures. The present disclosure, however, is not limited to such an orientation.

Briefly, the cellular core 26 is disposed and extends vertically between the top skin 22 and the bottom skin 24. The cellular core 26 is also connected to the top skin 22 and the bottom skin 24. The cellular core 26, for example, may be welded, brazed, fused, adhered and/or otherwise bonded to the top skin 22 and/or the bottom skin 24. The cellular core 26 may also or alternatively be mechanically fastened to the top skin 22 and/or the bottom skin 24. However, the present disclosure is not limited to any particular manufacturing methods.

Figure 2:
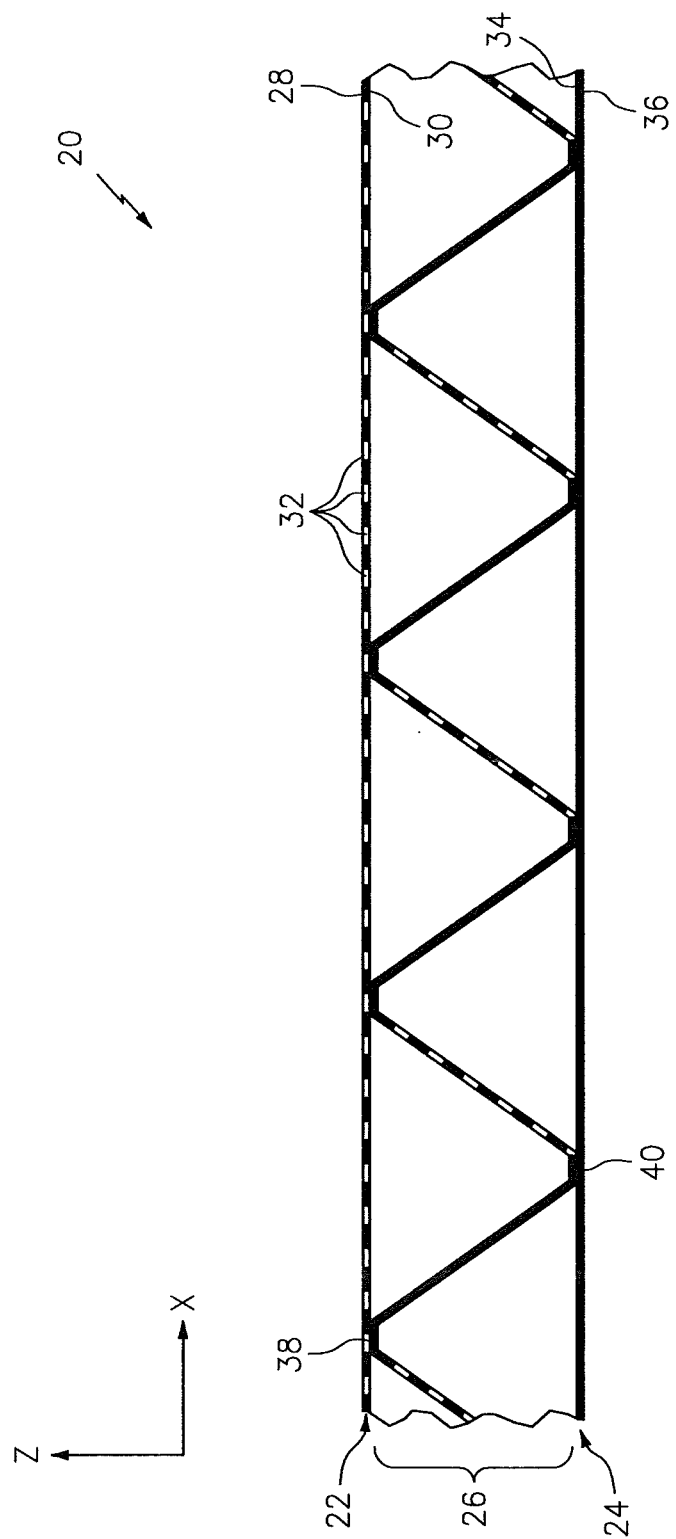
FIG. 2 is a sectional schematic illustration of a portion of the acoustic panel taken along line 2-2 in FIG. 3A.

The top skin 22 may be configured as a relatively thin sheet or layer of material that extends longitudinally and laterally along the x-y plane. This top skin 22 material may include, but is not limited to, a metal, a polymer, a fiber reinforced composite (e.g., fiberglass composite, carbon fiber composite, aramid fiber composite, etc.), or a combination thereof. Referring now to FIG. 2, the top skin 22 has a vertical thickness, which extends vertically between opposing first skin top and bottom side surfaces 28 and 30. The top skin 22 includes a plurality of perforations 32; e.g., apertures such as through-holes. Each of these perforations 32 extends generally vertically through the top skin 22 between its side surfaces 28 and 30. While the perforations 32 are described above and illustrated in FIG. 2 as through-holes for ease of description, one or more of the perforations 32 may also or alternatively be formed by one or more interconnected pores in the top skin 22 material.

The bottom skin 24 may be configured as a relatively thin sheet or layer of (e.g., solid, continuous and/or uninterrupted) material that extends longitudinally and laterally along the x-y plane (see FIG. 1). This bottom skin 24 material may include, but is not limited to, a metal, a polymer, a fiber reinforced composite (e.g., fiberglass composite, carbon fiber composite, aramid fiber composite, etc.), or a combination thereof. The bottom skin 24 material may be the same as or different than the top skin 22 material. The bottom skin 24 has a vertical thickness, which extends vertically between opposing second skin top and bottom side surfaces 34 and 36. This vertical thickness may be substantially equal to or different (e.g., greater or less) than the vertical thickness of the top skin 22.

Figure 3A:
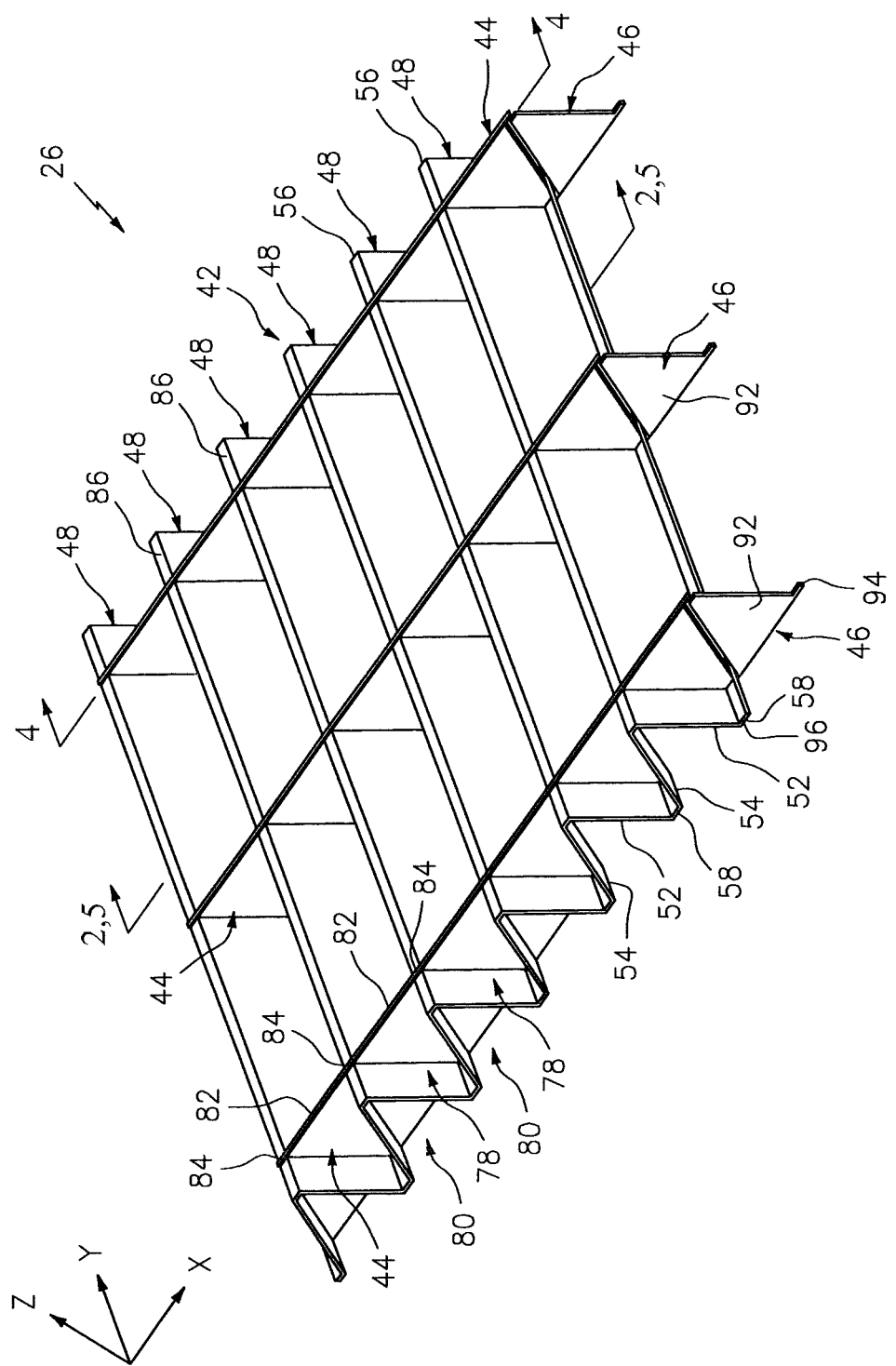
FIG. 3A is a perspective illustration of a portion of a cellular core for the acoustic panel.
Figure 3B:
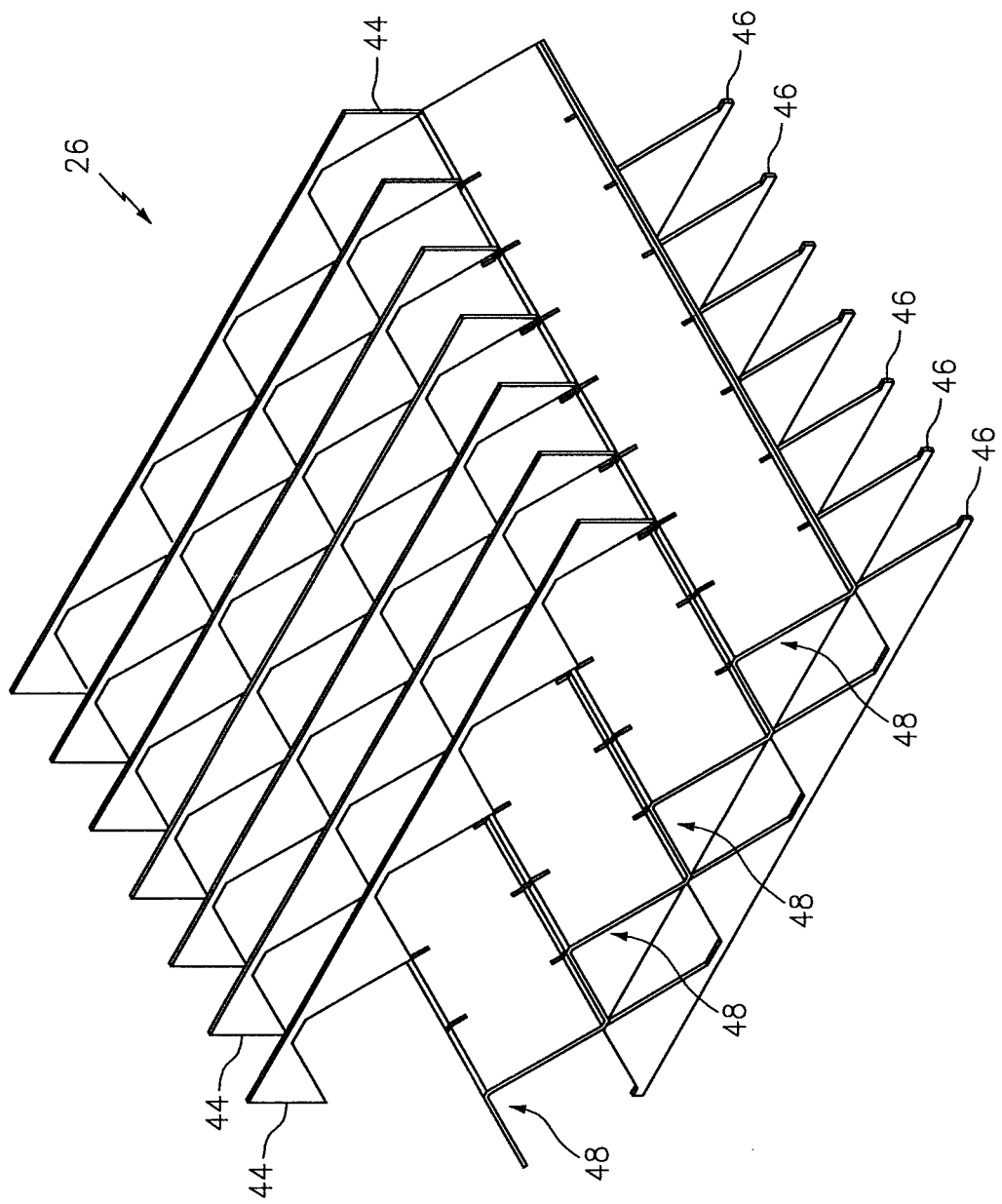
FIG. 3B is an exploded perspective illustration of the cellular core of FIG. 3A.

Referring to FIG. 3A (see also FIG. 3B), the cellular core 26 extends longitudinally and laterally along the x-y plane. Referring again to FIG. 2, the cellular core 26 has a vertical thickness, which extends vertically between opposing core sides 38 and 40 respectively abutted against the top skin 22 and the bottom skin 24. The vertical thickness may be substantially greater than the vertical thickness of the top skin 22 and/or the bottom skin 24. The vertical thickness of the core 26, for example, may be at least ten to forty times (10-40×), or more, greater than the vertical thickness of the skin 22, 24; however, the acoustic panel 20 of the present disclosure is not limited to such an exemplary embodiment.

Figure 4:
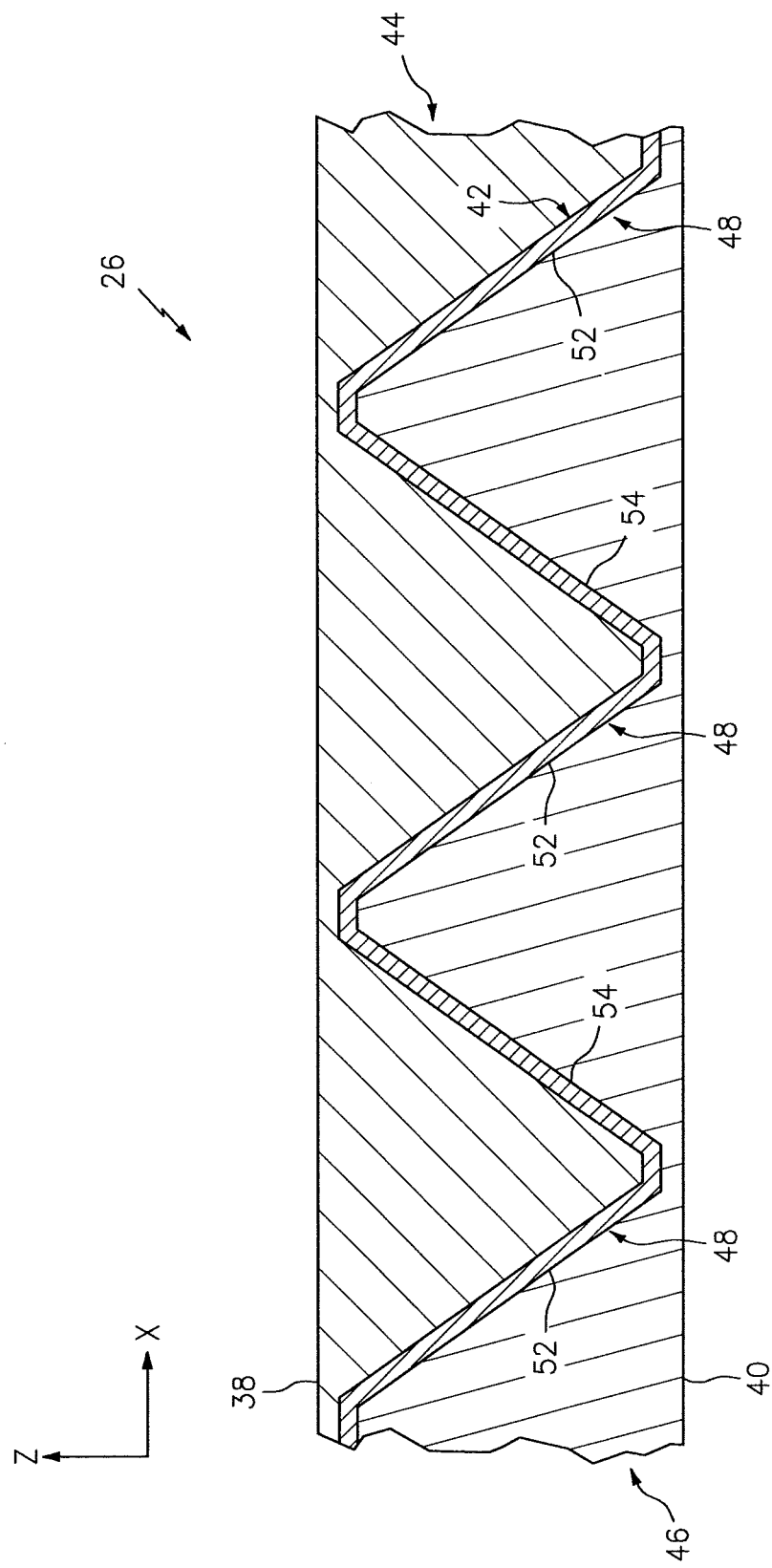
FIG. 4 is a sectional illustration of the cellular core of FIG. 3A taken along the line 4-4 in FIG. 3A.
Figure 5:
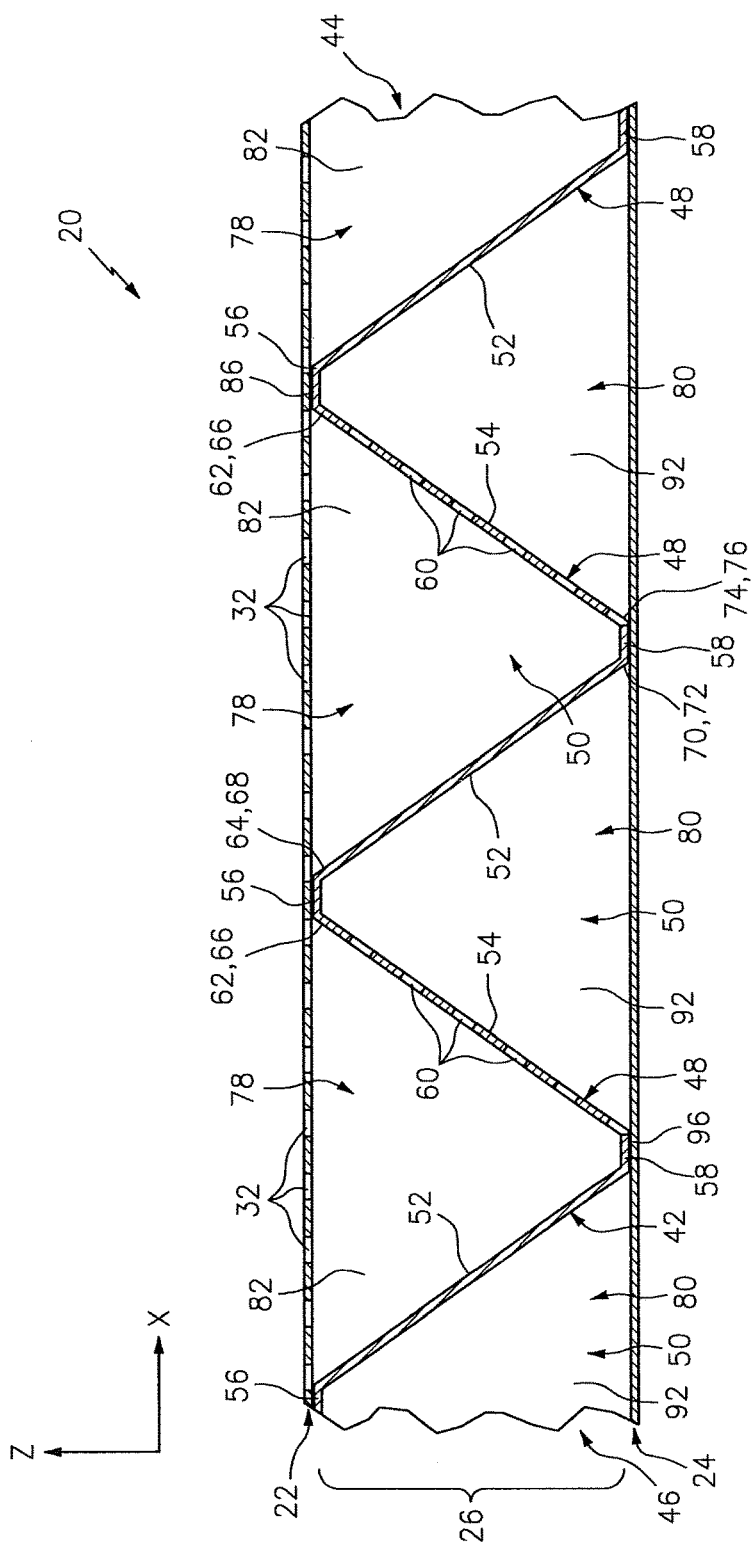
FIG. 5 is a sectional schematic illustration of another portion of the acoustic panel taken along line 5-5 in FIG. 3A.

Referring to FIGS. 3A, 4 and 5, the cellular core 26 includes a corrugated body 42, one or more top stringer bodies 44 and one or more bottom stringer bodies 46, where the top stringer bodies 44 and the bottom stringer bodies 46 are arranged on opposing sides of the corrugated body 42. More particularly, referring to FIG. 5, the top stringer bodies 44 are disposed vertically between the corrugated body 42 and the top skin 22. The bottom stringer bodies 46 are disposed vertically between the corrugated body 42 and the bottom skin 24. Each of the bottom stringer bodies 46 is also aligned longitudinally with a respective one of the top stringer bodies 44 as seen in FIG. 4.

Figure 6:
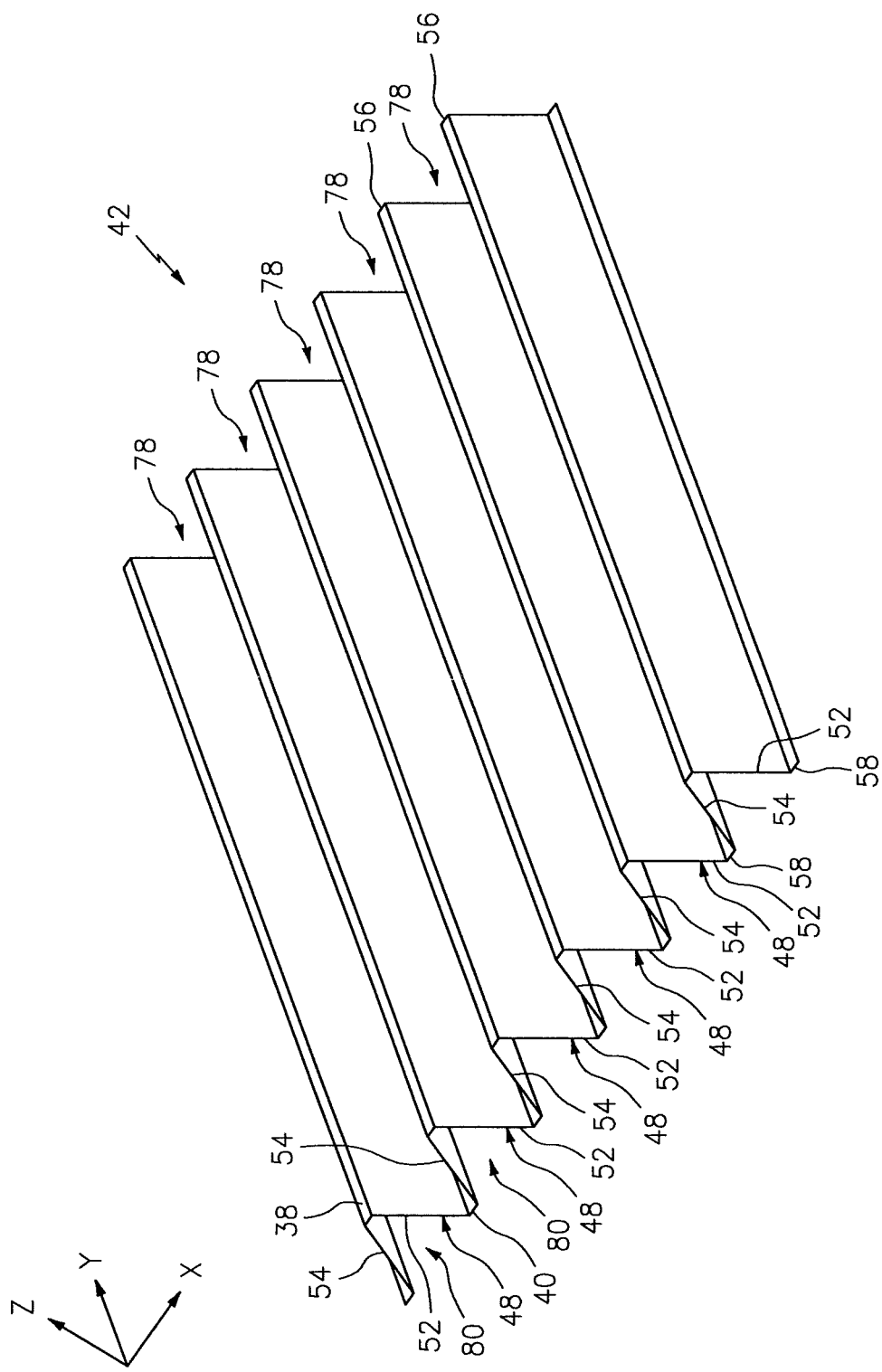
FIG. 6 is a perspective illustration of a corrugated body.

The corrugated body 42 of FIG. 5 includes a plurality of corrugations 48; see also FIG. 6. These corrugations 48 along with the top stringer bodies 44 and the bottom stringer bodies 46 are arranged together to configure the cellular core 26 as an open cavity (e.g., open cell) structure. This open cavity structure forms a plurality of cavities 50 (see also FIG. 10) vertically between the top skin 22 and the bottom skin 24. Each of these cavities 50 may be fluidly coupled with one or more respective perforations 32 in the top skin 22 (see FIG. 5).

Referring to FIGS. 5 and 6, the corrugations 48 are arranged in a laterally extending array. This arrangement provides the corrugated body 42 with an accordion wall structure. More particularly, the corrugations 48 are configured from at least a plurality of baffles 52 and a plurality of porous septums 54 (e.g., perforated septums). The corrugations 48 of FIGS. 5 and 6 are also configured from a plurality of top peak extensions 56 and/or a plurality of bottom peak extensions 58; however, in other embodiments, such extensions 56 and/or 58 may be omitted.

Each of the baffles 52 may be configured as a solid, continuous and/or uninterrupted panel of core material. Each of the septum 54 may be configured as a panel of core material with one or more perforations 60; e.g., apertures such as through-holes. While these perforations 60 are described and illustrated in FIG. 5 as through-holes for ease of description, one or more of the perforations 60 may also or alternatively be formed by one or more interconnected pores in the septum 54 material. Each of the top peak extensions 56 may be configured as a solid, continuous and/or uninterrupted panel of core material. Each of the bottom peak extensions 58 may be configured as a solid, continuous and/or uninterrupted panel of core material.

Each corrugation 48 includes a respective one of the baffles 52, a respective one of the septums 54, a respective one of the top peak extensions 56 and a respective one of the bottom peak extensions 58. Each of these corrugation portions 52, 54, 56 and 58 extends longitudinally along a longitudinal length of the respective corrugation 48 as shown in FIG. 6.

Referring to FIG. 5, the top peak extension 56 extends laterally from a distal first end 62 to a second end 64. The first end 62 may be connected to a top end 66 of a septum 54 in a laterally adjacent one of the corrugations 48. The second end 64 is connected to a top end 68 of the baffle 52. The baffle 52 extends laterally and/or vertically (e.g., diagonally) from its top end 68 to a bottom end 70, which is connected to a first end 72 of the bottom peak extension 58. The bottom peak extension 58 extends laterally from its first end 72 to a second end 74, which is connected to a bottom end 76 of the septum 54. The septum 54 extends laterally and/or vertically (e.g., diagonally) from its bottom end 76 to its top end 66, which may be connected to the first end 62 of the top peak extension 56 in a laterally adjacent one of the corrugations 48.

Referring to FIG. 6, each corrugation 48 forms a top channel 78 within the corrugated body 42. This top channel 78 extends laterally between the baffle 52 and the septum 54. The top channel 78 extends vertically into the corrugated body 42 from the core side 38 to the bottom peak extension 58. The top channel 78 also extends longitudinally along the entire longitudinal length of the corrugation 48.

Each laterally adjacent pair of the corrugations 48 also form a bottom channel 80 within the corrugated body 42. The bottom channel 80 extends laterally between the septum 54 of a first of the adjacent corrugations 48 to the baffle 52 of a second of the adjacent corrugations 48. The bottom channel 80 extends vertically into the corrugated body 42 from the core side 40 to the top peak extension 56 of the second of the adjacent corrugations 48. The bottom channel 80 also extends longitudinally along the entire longitudinal lengths of the adjacent corrugations 48. The top channels 78 and the bottom channels 80 are positioned on opposing sides of the corrugated body 42.

Referring to FIG. 3A, the top stringer bodies 44 are discretely spaced longitudinally along the top channels 78 and the corrugations 48. Referring to FIGS. 3A and 5, each top stringer body 44 extends laterally across one or more of the top channels 78 and the corrugations 48. For example, each top stringer body 44 includes one or more top sidewalls 82 arranged in a laterally extending array. Each top stringer body 44 also includes one or more top bridges 84.

Figure 8B:
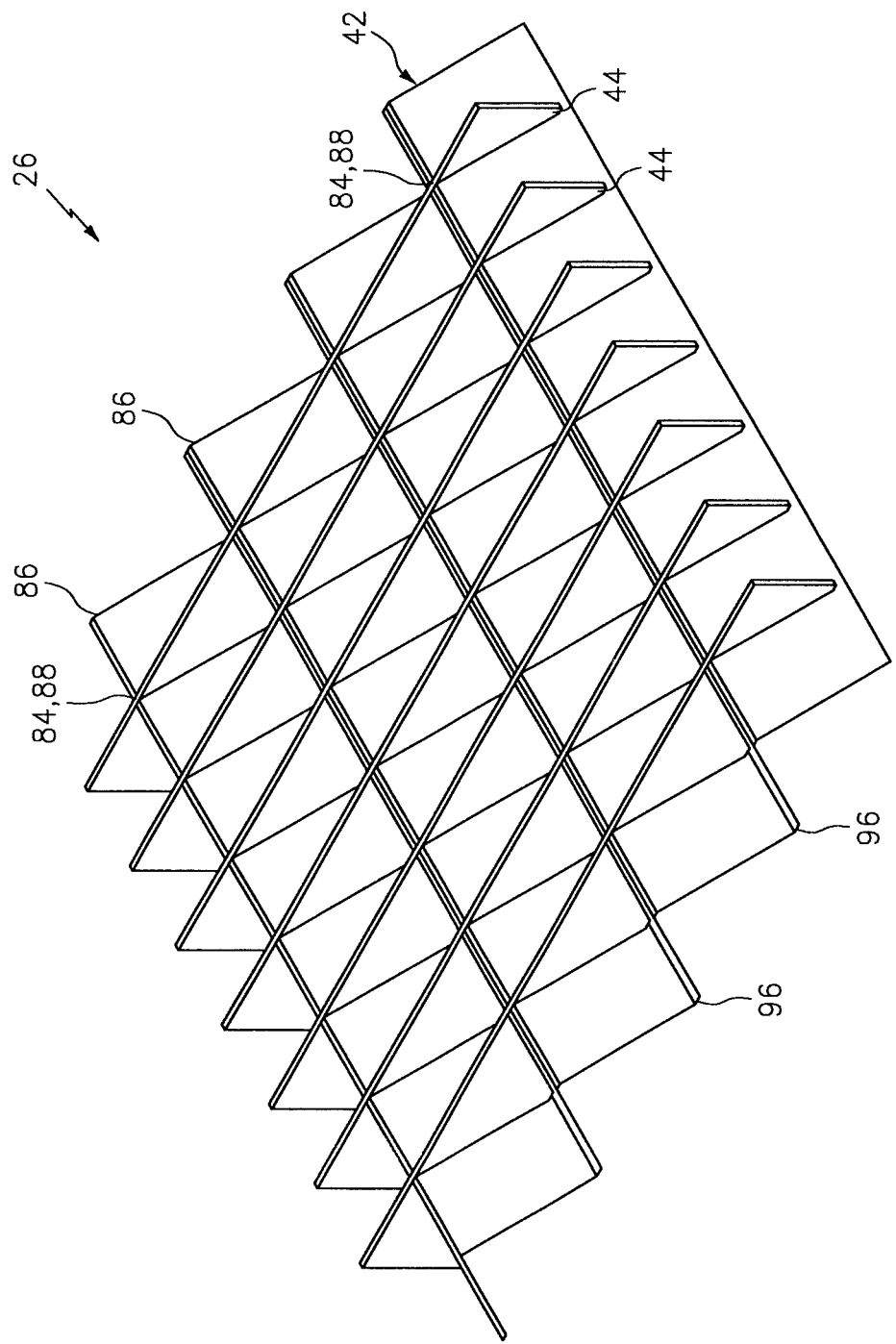
Figure 8C:
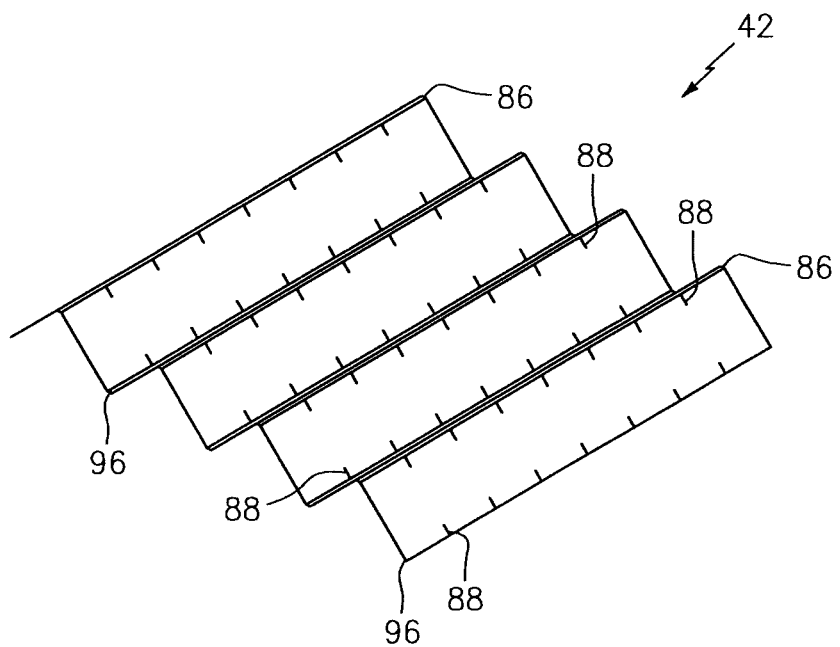
Figure 8D:
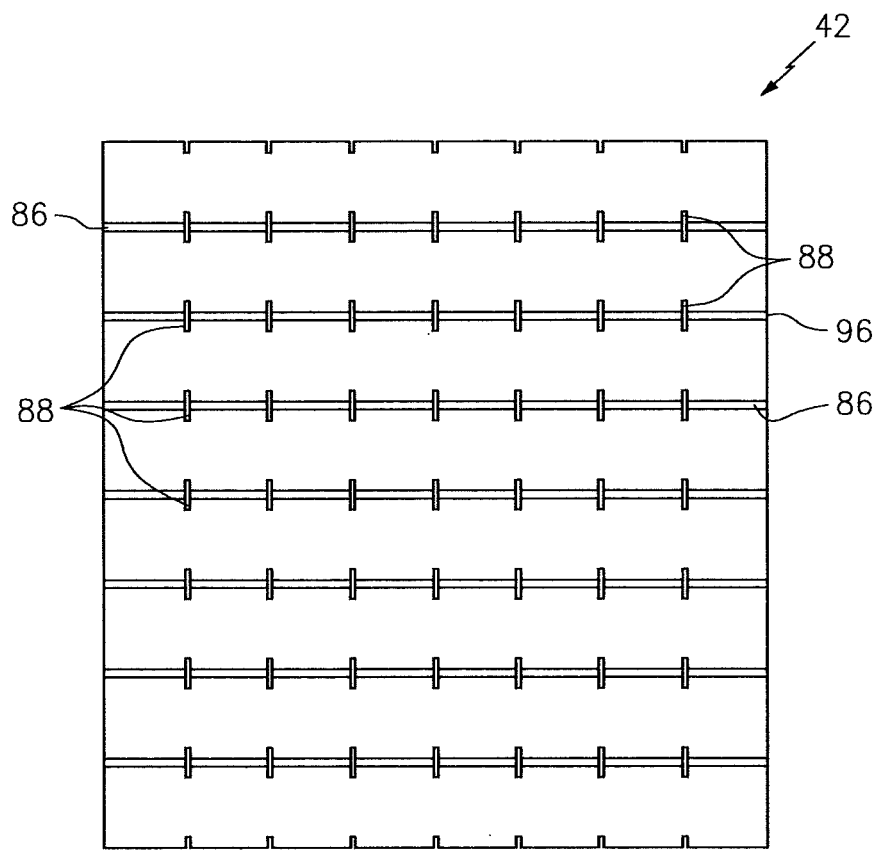

Each of the top bridges 84 extends laterally between and connects a respective laterally adjacent pair of the top sidewalls 82. Each of the top bridges 84 is configured to laterally cross a top peak 86 between laterally adjacent corrugations 48. In some embodiments, each top bridge 84 may be configured to cross over the top peak 86 as shown in FIG. 7. In other embodiments, each top bridge 84 may be configured as a tongue (e.g., tenon, key, etc.) that is mated with and disposed in a groove 88 (e.g., a mortice, slot, etc.) in the top peak 86 as shown in FIG. 8A; see also FIGS. 8B, 8C and 8D. In the embodiment of FIG. 8A, the groove 88 extends vertically through the respective top peak extension 56 and into the respective baffle 52 and septum 54. Furthermore, the tongue (e.g., 84) and the groove 88 are configured such that the respective top stringer body 44 and the corrugated body 42 are vertically flush at the core side 38.

Figure 9B:
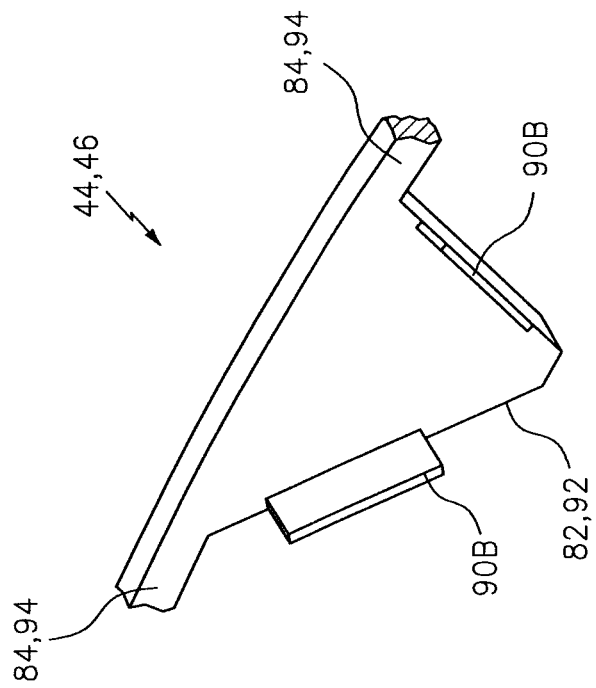
FIGS. 9A and 9B are perspective illustrations of portions of alternative stringer bodies.
Figure 9A:
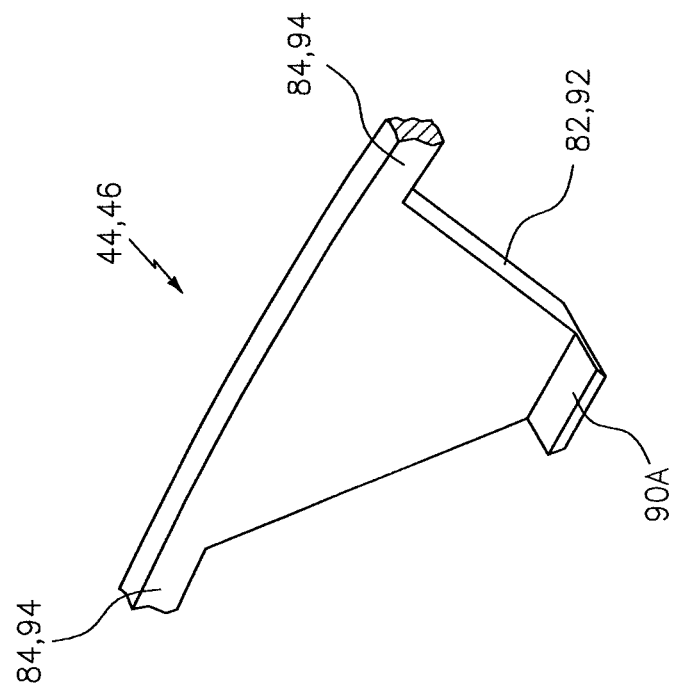

Referring again to FIGS. 3A and 4, each top sidewall 82 is configured with a shape that substantially matches a cross-sectional shape of a respective one of the top channels 78; e.g., see FIG. 5. Each top sidewall 82 is disposed within a respective one of the top channels 78 and configured to substantially fluidly isolate longitudinally adjacent portions of that top channel 78 from one another. More particularly, the top sidewall 82 extends laterally across the top channel 78 between the respective baffle 52 and the respective septum 54. The top sidewall 82 extends vertically into the top channel 78 to a respective top peak extension 56. The top sidewall 82 may also be attached (e.g., adhered and/or otherwise bonded) to one or more of the corrugated body portions 52, 54 and/or 58. This attachment may be a direct attachment as shown in FIG. 3A or through one or more intermediate members such as one or more of the flanges 90A and 90B shown in FIGS. 9A and 9B.

Referring to FIG. 3A, the bottom stringer bodies 46 are discretely spaced longitudinally along the bottom channels 80 and the corrugations 48. Referring to FIGS. 3A and 4, each bottom stringer body 46 extends laterally across one or more of the bottom channels 80 and the corrugations 48. For example, each bottom stringer body 46 includes one or more bottom sidewalls 92 arranged in a laterally extending array. Each bottom stringer body 46 also includes one or more bottom bridges 94.

Each of the bottom bridges 94 extends laterally between and connects a respective laterally adjacent pair of the bottom sidewalls 92. Each of the bottom bridges 94 is configured to laterally cross a bottom peak 96 between laterally adjacent corrugations 48. In some embodiments, each bottom bridge 94 may be configured to cross over the bottom peak 96 as shown in FIG. 7. In other embodiments, each bottom bridge 94 may be configured as a tongue (e.g., tenon, key, etc.) that is mated with and disposed in a groove 98 (e.g., a mortice, slot, etc.) in the bottom peak 96 as shown in FIG. 8.

Referring again to FIGS. 3A and 4, each bottom sidewall 92 is configured with a shape that substantially matches a cross-sectional shape of a respective one of the bottom channels 80; e.g., see FIG. 5. Each bottom sidewall 92 is disposed within a respective one of the bottom channels 80 and configured to substantially fluidly isolate longitudinally adjacent portions of that bottom channel 80 from one another. More particularly, the bottom sidewall 92 extends laterally across the bottom channel 80 between respective baffle 52 and a respective septum 54. The bottom sidewall 92 extends vertically into the bottom channel 80 to a respective bottom peak extension 58. The bottom sidewall 92 may also be attached (e.g., adhered and/or otherwise bonded) to one or more of the corrugated body portions 52, 54 and/or 56. This attachment may be a direct attachment or through one or more intermediate members such as one or more of the flanges 90A and/or 90B; e.g., see FIGS. 9A and 9B.

Figure 10:
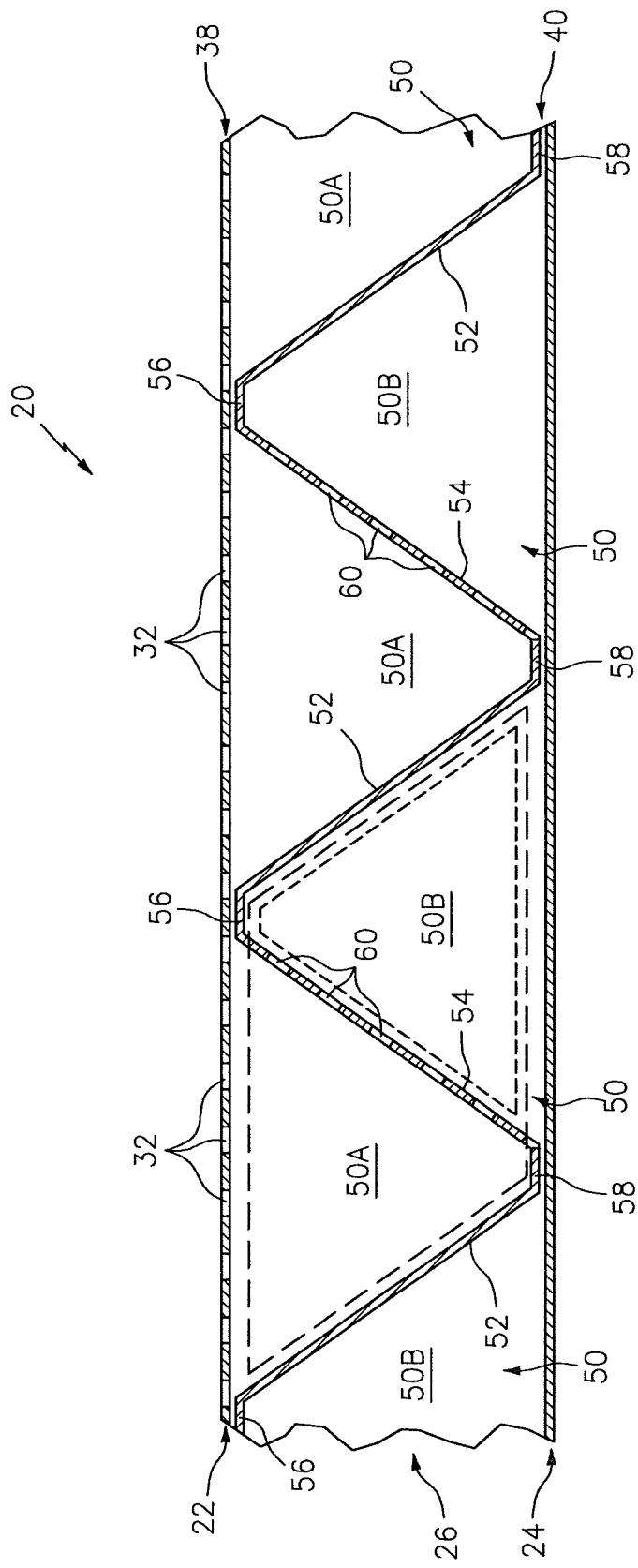
FIG. 10 is another sectional schematic illustration of the portion of the acoustic panel taken along line 5-5 in FIG. 3A.

Referring to FIG. 10, each of the cavities 50 extends laterally between and is formed by a laterally adjacent pair of the baffles 52. Each of the cavities 50 extends vertically between the top skin 22 and the bottom skin 22. Referring to FIG. 3A, each of the cavities 50 extends longitudinally between a laterally adjacent pair of the top sidewalls 82 and a laterally adjacent pair of the bottom sidewalls 92. Referring again to FIG. 10, each septum 54 is disposed within and divides a respective one of the cavities 50 into fluidly coupled sub-cavities 50A and 50B. More particularly, the perforations 60 in the septum 54 fluidly couple the sub-cavities 50A and 50B together. The top sub-cavity 50A corresponds to the portion of a respective one of the top channels 78 between the adjacent top sidewalls 82; see also FIGS. 3A and 6. The bottom sub-cavity 50B corresponds to the portion of a respective one of the bottom channels 80 between the adjacent bottom sidewalls 92; see also FIGS. 3A and 6.

Each of the cavities 50 forms a resonance chamber. A length of the resonance chamber extends diagonally between the top skin 22 and the bottom skin 24 and through a respective one of the septums 54. The length of the resonance chamber therefore is longer than the vertical thickness of the cellular core 26. This enables noise attenuation of relatively low frequency noise without increasing the vertical thickness of the core 26 and, thus, a vertical thickness of the acoustic panel 20. For example, each resonance chamber may receive acoustic waves through the perforations 32 in the top skin 22. The resonance chamber may reverse the phase of one or more frequencies of those sound waves using known acoustic reflection principles and subsequently direct the reverse phase sound waves out of the acoustic panel 20 through the perforations 32 to destructively interfere with other incoming acoustic waves.

The corrugated body 42 may be constructed from any suitable material(s). The corrugated body 42, for example, may be constructed from a metal, a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof. The corrugated body 42 may be constructed from the same material(s) as the top skin 22 and/or the bottom skin 24, or a different material or materials.

The top and/or bottom stringer bodies 44 and 46 may be constructed from any suitable material(s). The corrugated body 42, for example, may be constructed from a metal (e.g., sheet metal), a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof. One or more of the stringer bodies 44, 46 may be constructed from the same material(s) as the corrugated body 42, the top skin 22 and/or the bottom skin 24, or a different material or materials. For example, the corrugated body 42 may be constructed from composite material whereas the stringer bodies 44, 46 may be constricted from the same type of composite material, a different type of composite material, polymer material or metal (e.g., stamped and/or folded sheet metal).

In some embodiments, each of the stringer bodies 44, 46 may be configured as an unsegmented, unitary body. Such a configuration may enable assembly personnel to quickly and efficiently assembly the cellular core 26. The configuration of the stringer bodies 44, 46 disclosed herein also lend to simply fabrication techniques; e.g., injection molding; sheet metal fabrication via cutting, stamping, bending; etc. Furthermore, one piece may be used to divide multiple channels 78, 80 since each stringer body 44, 46 extends laterally across multiple corrugations 48 and channels 78, 80. However, in other embodiments, one or more of the stringer bodies 44, 46 may each be configured as a segmented body. Each of these stringer body 44, 46 segments may be configured as a discrete body, which collectively are aligned to provide the stringer body 44, 46. Each segment may be configured with one or more of the sidewalls 82, 92.

In some embodiments, the stringer bodies 44, 46 may be configured such that the sidewalls 82, 92 are substantially perpendicular to the top skin 22 and/or the bottom skin 24 (e.g., substantially vertical). However, in other embodiments, one or more of the stringer bodies 44, 46 may be configured such that the sidewalls 82, 92 are (e.g., acutely or obtusely) angled relative to the top skin 22 and/or the bottom skin 24.

Figure 11:
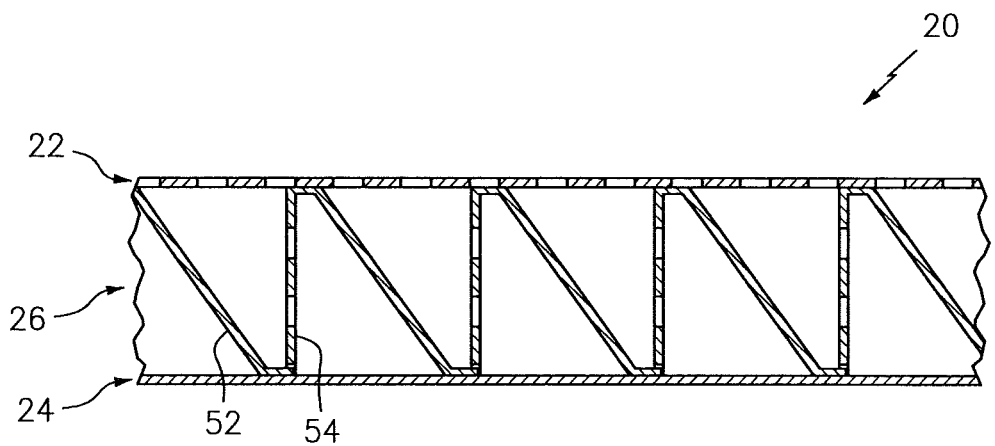
FIG. 11 is a sectional schematic illustration of a portion of an alternative acoustic panel.

In some embodiments, both the baffles 52 and the septums 54 may be (e.g., acutely or obtusely) angled relative to the top skin 22 and/or the bottom skin 24 as shown in FIG. 5. However, in other embodiments, the baffles 52 or the septums 54 may be substantially perpendicular to the top skin 22 and/or the bottom skin 24 (e.g., substantially vertical) as shown in FIG. 11.

Figure 12:
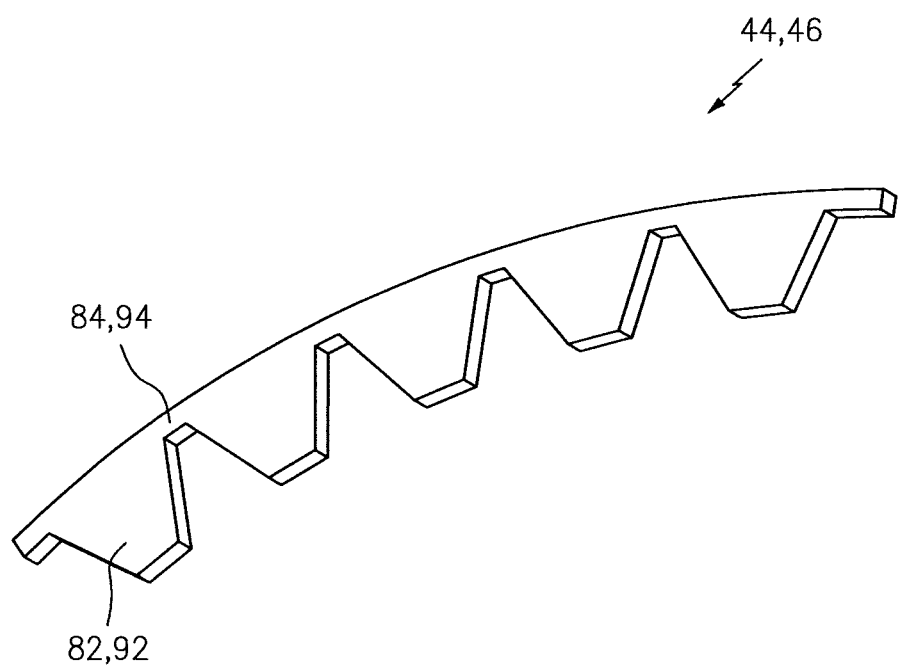
FIG. 12 is a perspective illustration of a stringer body.
Figure 13:
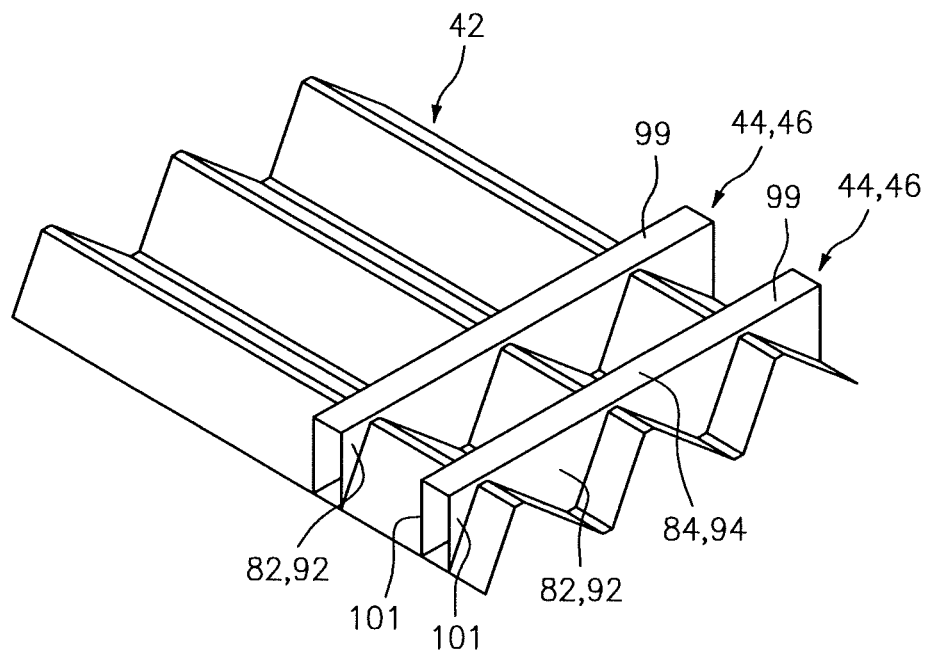
FIG. 13 is a perspective illustration of alternative stringer bodies bonded to a corrugated body.

In some embodiments, each sidewall 82, 92 may have a single wall structure as shown in FIG. 12. In other embodiments, each sidewall 82, 92 may have a multi-wall (e.g., double wall) structure as shown in FIG. 13 where, for example, the respective stringer body 44, 46 is formed from a folded over piece of sheet metal. It is worth noting, the width of intermediate portion 99 is exaggerated for ease of illustration. Typically, the intermediate portion 99 width will be minimized to reduce space between layers 101 of the sidewall. For example, in some embodiments, the intermediate portion 99 may be a fold line such that the layers 101 of the sidewall are essentially touching one another. Of course, the present disclosure is not limited to such embodiments; e.g., there may be spacing between the layers 101 of the sidewall.

Figure 14:
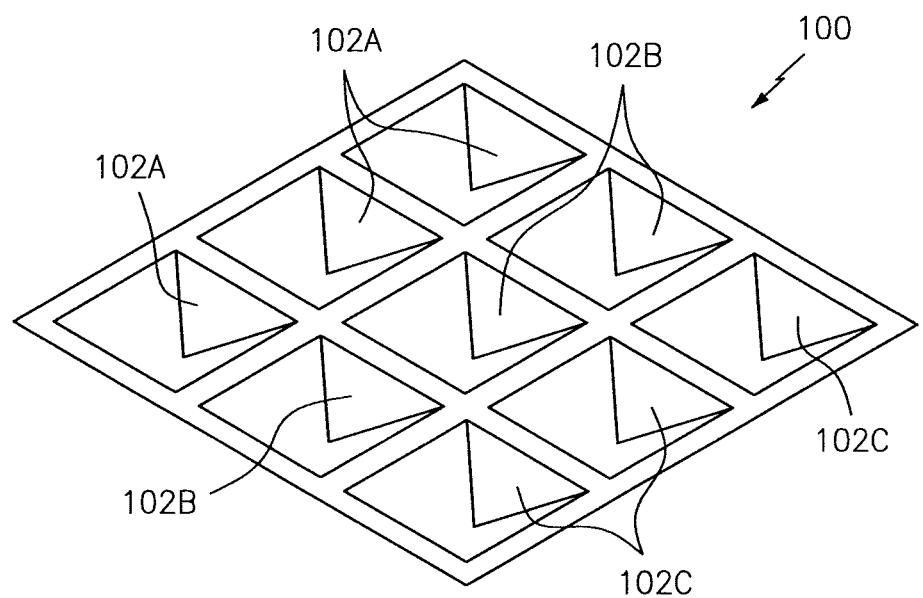
FIG. 14 is a perspective illustration of another alternative stringer body.

The stringer bodies 44, 46 are described above and being generally planar; e.g., generally lying in the vertical-lateral plane. However, in other embodiments, a single stringer body 100 may be configured to also extend into the longitudinal plane. Such a configuration enables that single stringer body 100 to also include a plurality of sidewalls 102A, 102B or 102C (generally referred to as 102) in the same channel 78, 80 as shown in FIG. 14. The stringer body 100 of FIG. 14, for example, is also configured to extend longitudinally along a plurality of the channels 78, 80 and arranged a plurality of sidewalls 102 respectively in each of those channels 78, 80.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A panel for attenuating noise, comprising:
a porous first skin;
a second skin; and
a core connected between the porous first skin and the second skin, the core including a corrugated body and a plurality of stringer bodies;
the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between a first of the baffles and a first of the porous septums; and
the stringer bodies spaced longitudinally along the first channel, each of the stringer bodies comprising a first sidewall disposed within the first channel and configured to fluidly isolate longitudinally adjacent portions of the first channel from one another;
wherein each of the stringer bodies further includes a tongue laterally connected to the first sidewall, and the tongue is mated with a respective groove in a peak formed by the first of the baffles and a second of the porous septums.

2. The panel of claim 1, wherein
a second of the corrugations forms a second channel that extends laterally between a second of the baffles and a second of the porous septums; and
each of the stringer bodies comprising a second sidewall disposed within the second channel and configured to fluidly isolate longitudinally adjacent portions of the second channel from one another.

3. The panel of claim 1, wherein each of the stringer bodies extends laterally across the first of the corrugations and a second of the corrugations.

4. The panel of claim 1, wherein the first sidewall of each of the stringer bodies extends from the porous first skin to the first of the baffles and the first of the porous septums.

5. The panel of claim 1, wherein the first sidewall of each of the stringer bodies extends from the second skin to the first of the baffles and the first of the porous septums.

6. The panel of claim 1, wherein
a second channel extends laterally between the first of the porous septums and a second of the baffles;
the core further includes a plurality of second stringer bodies;
each of the second stringer bodies comprising a second sidewall disposed within the second channel and configured to fluidly isolate longitudinally adjacent portions of the second channel from one another.

7. The panel of claim 6, wherein the first channel and the second channel are on opposing sides of the corrugated body.

8. The panel of claim 6, wherein
a cavity extends laterally between the first of the baffles and the second of the baffles and is fluidly coupled with perforations in the porous first skin;
the first septum extending from the porous first skin and the first of the baffles to the second skin and the second of the baffles, and dividing the cavity into fluidly coupled first and second sub-cavities;
the first sub-cavity extends longitudinally between the first sidewalls of an adjacent pair of the stringer bodies; and
the second sub-cavity extends longitudinally between the second sidewalls of an adjacent pair of the second stringer bodies.

9. The panel of claim 1, wherein
a second of the corrugations forms a second channel that extends laterally between a second of the baffles and the second of the porous septums;
each of the stringer bodies comprising a second sidewall disposed within the second channel and configured to fluidly isolate longitudinally adjacent portions of the second channel from one another, and the tongue is configured as a bridge that extends laterally between and connects the first sidewall and the second sidewall.

10. A panel for attenuating noise, comprising:
a porous first skin;
a second skin; and
a core connected between the porous first skin and the second skin, the core including a corrugated body and a plurality of stringer bodies;

the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between a first of the baffles and a first of the porous septums; and the stringer bodies spaced longitudinally along the first channel, each of the stringer bodies comprising a first sidewall disposed within the first channel and configured to fluidly isolate longitudinally adjacent portions of the first channel from one another;

wherein a second of the corrugations forms a second channel that extends laterally between a second of the baffles and a second of the porous septums;

wherein each of the stringer bodies comprising a second sidewall and a bridge;

wherein the side sidewall is disposed within the second channel and configured to fluidly isolate longitudinally adjacent portions of the second channel from one another; and wherein the bridge extends laterally between and connects the first sidewall and the second sidewall.

11. The panel of claim 10, wherein the bridge lays over a peak formed by the first of the baffles and the second of the porous septums.

12. The panel of claim 1, wherein the first sidewall is configured as a single wall structure.

13. A panel for attenuating noise, comprising:
a porous first skin;
a second skin; and
a core connected between the porous first skin and the second skin, the core including a corrugated body and a plurality of stringer bodies;
the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between a first of the baffles and a first of the porous septums; and the stringer bodies spaced longitudinally along the first channel, each of the stringer bodies comprising a first sidewall disposed within the first channel and configured to fluidly isolate longitudinally adjacent portions of the first channel from one another;

wherein the first sidewall is configured as a multi-wall structure.

14. A panel for attenuating noise, comprising:
a porous first skin;
a second skin; and
a core connected between the porous first skin and the second skin, the core including a corrugated body and a plurality of stringer bodies;
the corrugated body including a plurality of corrugations configured from at least a plurality of baffles and a plurality of porous septums, each of the corrugations including a respective one of the baffles and a respective one of the porous septums, wherein a first of the corrugations forms a first channel that extends laterally between a first of the baffles and a first of the porous septums; and the stringer bodies spaced longitudinally along the first channel, each of the stringer bodies comprising a first sidewall disposed within the first channel and configured to fluidly isolate longitudinally adjacent portions of the first channel from one another;

wherein each of the stringer bodies further includes a tab that projects out from the first sidewall and is attached to the corrugated body.

15. The panel of claim 1, wherein each of the stringer bodies is formed from sheet metal.

16. The panel of claim 1, wherein
the corrugated structure comprises composite material; and
each of the stringer bodies comprises metal.

17. The panel of claim 1, wherein each of the stringer bodies comprises polymer.

* * * * *